United States Patent Office 3,040,061
Patented June 19, 1962

3,040,061
N-SUBSTITUTED AMIDES OF OMEGA-HYDRA-ZINO ALKANOIC ACIDS
Barry M. Bloom, Lyme, Conn., and Robert E. Carnahan, Evansville, Ind., assignors to Chas. Pfizer & Co., Inc., New York, N.Y., a corporation of Delaware
No Drawing. Continuation of application Ser. No. 808,921, Apr. 27, 1959. This application June 1, 1961, Ser. No. 114,002
8 Claims. (Cl. 260—347.3)

This invention relates to new and useful compounds which are valuable therapeutic agents. More particularly, it is an object of this invention to provide new and useful compounds which are chemotherapeutic agents valuable in the treatment of mental disease, commonly referred to as psychic energizers. Other objects of the present invention will become obvious from the following disclosure.

The new compounds of the present invention may be represented by the following formula:

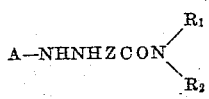

in which Z is an alkylene radical containing 1 to 5 carbon atoms
$R_1$ is hydrogen or lower alkyl;
$R_2$ is selected from the group consisting of alkyl and alkenyl preferably containing up to 5 carbon atoms; cycloalkyl containing 3 to 6 carbon atoms, pyridyl, pyridylalkyl, furylalkyl and thienylalkyl in which the akyl group is lower alkyl, and ring-substituted derivatives thereof in which said ring-substituent is a lower alkyl group; aryl and aralkyl represented by the formula:

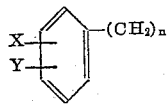

wherein X is hydrogen, lower alkyl or halogen; Y is hydrogen, lower alkyl, lower alkoxy, halogen, trifluoromethyl, cyano or alkanoyl containing 2 to 4 carbon atoms; and $n$ is an integer from 0 to 4.
A is hydrogen or an acyl group of the formula

wherein R is selected from the group consisting of

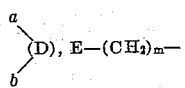

and

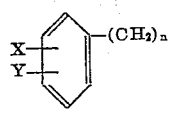

wherein D is selected from the group consisting of alkyl and alkenyl containing up to 20 carbon atoms; $a$ and $b$ are substituents each selected from the group consisting of hydrogen, amino, lower alkylamino, hydroxy, lower alkoxy, mercapto, lower alkylmercapto, halogen and alkanoylamino, alkanoyloxy and alkanoylmercapto, in which the alkanoyl group contains 2 to 4 carbon atoms. E is selected from the group consisting of cycloalkyl containing 3 to 6 carbon atoms, pyridyl, furyl, thienyl, thiazolyl, oxazolyl, isoxazolyl and ring-substituted derivatives thereof in which said ring-substituent is a lower alkyl group $m$ is an integer from 0 to 4, and X, Y and $n$ are as previously described.

Also included within the scope of this invention are the acid addition salts of the basic nitrogen compounds described.

The alkylene radicals of which Z is representative are derived from aliphatic groups containing two unoccupied valences which permit them to be further connected as indicated for Z in the structural formula. Such radicals may be straight or branched and contain from 1 to 4 carbon atoms in their principal chain, that is, in the carbon chain between the two unoccupied valences. The carbon content of the various hydrocarbon substituents described above represents preferred substituents. These are preferred since compounds containing them are readily preparable and economical. Of course, substituents of higher carbon content may be employed.

The various hydrocarbon radicals described may be further substituted by the various substituents previously mentioned. Further, the aryl and heterocyclic radicals may be replaced by the corresponding benz-type compounds, that is, those containing a fused benzene ring, such as naphthalene, benzofuran, benzothiophene and the like, with no appreciable advantage being realized. Particularly valuable are compounds of the formula:

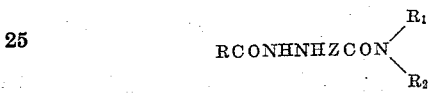

especially those in which $R_2$ is an aralkyl group. Additionally, those compounds in which RCO is derived from an amino acid possess desirable therapeutic properties.

The new compounds of this invention may be prepared by reaction of an amine of the formula, $R_1(R_2)NH$, in which $R_1$ and $R_2$ are as described above, with corresponding lower alkyl esters of the formula:

wherein $R_4$ is alkyl preferably containing 1 to 3 carbon atoms and A and Z are as described above. It is obvious that those compounds in which A is an acyl group (RCO) may also be prepared by the acylation of the compounds in which A is hydrogen. Although the reaction may be brought about by simply mixing the selected amine with the alkyl ester and allowing the mixture to stand at room temperature (about 20° C.) for from about 1 to about 3 days, it is generally preferred to heat the reaction mixture to a temperature of from about 60° to about 200° C. since shorter reaction time is realized in so doing. For example, when the reaction is carried out at about 130° C., a reaction time of 2 to 4 hours is found to give excellent yield of product. Generally, an equal molar ratio of reactants is employed although slight molar excesses (up to 10%) of amine may be advantageously used in the present process. The use of a larger excess provides no appreciable advantage and is not preferred. After the reaction is complete, the cooled reaction mass is recrystallized from a suitable solvent, such as ethyl acetate, lower alkanols, for example, methanol, ethanol, propanol etc. and the like.

The above mentioned alkyl esters which are used in the preparation of the instant therapeutic agents may be prepared by procedures known in the art. One such procedure involves two steps, the first, the formation of the hydrazone of a suitable carbonyl compound, and the second, the reduction of the hydrazone to the desired ester.

The first of these reactions is brought about by refluxing the carbonyl compound with the selected hydrazine in a lower alkanol, such as methanol, ethanol or propanol, or aromatic hydrocarbon such as benzene, toluene, etc. Excellent yields are obtained after heating for periods of from about 1 to 4 hours. Many of the products separate almost instantaneously on initiating reaction. After the reaction is complete, the hydrazone is obtained by cooling the reaction mixture and filtering. The product may be further treated by standard procedures of recrystallization. The second step, viz. hydrogenation of the hydrazone, may be accomplished by reaction with hydrogen over a platinum oxide catalyst. The hydrogenation is conveniently effected at pressures slightly higher than atmospheric pressure, for example, 30 to 50 pounds of hydrogen gas per square inch. The use of higher pressures provides no appreciable advantage and is therefore, not preferred. The selected condensation product is dissolved in a lower alkanol and reacted with hydrogen gas over the above-described catalyst, employed at 1% to 5% by weight of the substrate. The mixture is shaken in a standard shaker apparatus until the theoretical quantity of hydrogen gas is taken up. The desired product is then obtained by the usual procedures of filtration of catalyst and concentration of the filtrate. Alternatively, a hydrazinoalkanoic acid ester of hydrazinoalkanoamide may be acylated to form those compounds in which A is an acyl group employing standard procedures, such as a suitable acid chloride (RCOCl) in the presence of pyridine. Additional preparative methods are obvious to one skilled in the art. For example, the selected hydrazine compound may be reacted with a suitable amide, such as

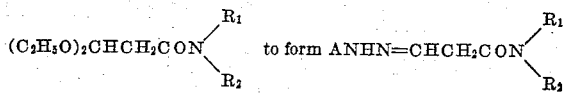

followed by hydrogenation of the resulting hydrazone to obtain the desired product.

It has been surprisingly found that a class of the alkyl esters from the group represented by the formula $RCONHNHZCOOR_4$ as well as the corresponding amides of the formula

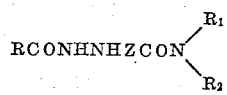

may be prepared by the condensation of a hydrazine, $RCONHNH_2$ with $\alpha,\beta$-unsaturated esters or amides of the formula: $R_3CH=CHCOG$, wherein G is selected from the group consisting of

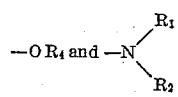

in which $R_4$, $R_1$ and $R_2$ are as described above and $R_3$ is hydrogen or lower alkyl containing 1 to 3 carbon atoms. This class of compounds is represented by the formula $RCONHNHCH(R_3)CH_2COG$. Interfering groups such as amino, hydroxy and mercapto should not be present in the acylhydrazide, $RCONHNH_2$, employed in this process. Such groups are known to react with $\alpha,\beta$-unsaturated acids and may appreciably reduce the yield of desired product. Those compounds in which R contains free mercapto, amino and hydroxy groups are best prepared by protecting these free groups, for example, by acylation. The reaction is best effected employing acylhydrazides, $RCONHNH_2$, in which R is $E—(CH_2)_m—$ in which E and $m$ are as previously described;

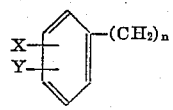

in which X, Y and $n$ are as previously described; and

in which D is as previously described and $c$ and $d$ are substituents each selected from the group consisting of hydrogen, lower alkylamino, halogen, lower alkoxy, lower alkylmercapto and alkanoylamino, alkanoylmercapto and alkanoyloxy, in which the alkanoyl group contains 2 to 4 carbon atoms.

For example, a lower alkyl ester of acrylic acid is condensed with $RCONHNH_2$, in which R is as above described to produce $$RCONHNH—CH_2CH_2COOR_4$$

The reaction is carried out by heating a mixture of the two reactants in at least an equimolar ratio in an inert organic solvent and in the presence of a lower alkanoic acid which is generally employed in catalytic amounts. At least 1% of alkanoic acid by volume of the total reaction mixture should be employed. Generally, it is found that the optimum level of alkanoic acid is from 1% to 5% by volume of the total reaction mixture. Larger amounts of catalyst may be used but reduced yield of product may be realized in so doing. Although it is preferred to employ acetic acid as catalyst, other lower alkanoic acids may be used, viz. formic, propionic, butyric and the like. By inert organic solvents as employed herein is meant an organic solvent which dissolves the reactants but does not react with same under the reaction conditions described. Such solvents may be readily determined by routine experimentation in the laboratory. Although a number of other solvents may be employed, excellent results are obtained when using tertiary alcohols. Tertiary alcohols, as is well known, are alcohols in which there is no hydrogen on the carbon atom to which the hydroxy group is attached, each of the valences of this carbon atom are involved in carbon to carbon linkage. Exemplary of these alcohols are tertiary butyl alcohol, 1,1-dimethylpropanol, 1,1-dimethylbutanol, 1-methyl-1 ethylbutanol, 1,1-dimethylpentanol and the like. The mixture is conveniently heated at the reflux temperature of the solvent, although lower temperatures may also be employed, for example, a temperature of 50° C. The reaction is completed in as little as 6 hours although generally, time periods of from 6 to 18 hours at the above specified temperatures are employed. In many cases, the use of excess $\alpha,\beta$-unsaturated acid ester is found to appreciably improve the yield of the product. Up to 40% molar excess of unsaturated ester is found to enhance the yield of product. After the reaction is complete, the product is obtained by standard procedures, such as concentration, crystallization and filtration procedures. The product may be purified by standard procedures of recrystallization from solvents such as lower alkanols for example, methanol, ethanol, propanol, etc., ethyl acetate, acetone and the like.

The new therapeutic agents of the present invention possess a considerably higher activity in the treatment of mental depression than prior art agents. Further, the instant agents possess a higher therapeutic index than prior art agents. Therapeutic index as employed herein refers to the ratio of therapeutic activity to toxicity. The use of many prior art agents in the treatment of mental depression is attended by considerable toxic reactions in the patient. The ratio of activity to toxicity of a therapeutic agent is obviously most important in selecting such an agent. Although many agents are quite active therapeutically, their use is seriously curtailed by excessive toxicity. The present therapeutic agents, due to their high therapeutic index, are more desirable for treatment of mental depression than prior art agents. The new therapeutic agents of this invention in which R is a 4-pyridyl radical additionally possess appreciable antitubercular activity, while those in which R is phenyl, 2-pyridyl, 3-pyridyl, thienyl, or furyl radicals do not.

The physician will indicate daily dosage of the therapeutic agents of this invention. The dosage will be dependent upon the extent of mental depression, whether mild or severe. In cases of mild depression, dosage of from 10 to 50 milligrams per day may be indicated. In severe depression, considerably higher daily dosage may be required, for example, up to 150 milligrams and higher.

Tablets or capsules containing 10, 25, 50 and 150 milligrams of the instant therapeutic agents are convenient unit dosage forms for daily administration. Such tablets or capsules may be prepared from mixtures of the present compounds with well known pharmaceutical excipients, such as starch, sugar, tapioca, certain forms of clay and the like. Alternatively, liquid preparations may be prepared from mixtures of the present therapeutic agents and pharmaceutically acceptable liquid media, such as water, aqueous glycols, sugar solutions and the like which may contain conventional flavoring and coloring agents.

Since many of the compounds of the present invention are basic, advantage may be taken of the water solubility of salts of these compounds formed with acids in the isolation and/or purification of the above compounds and in the preparation of aqueous solutions of these new compounds for oral or parenteral administration. Of course, only salts formed with pharmaceutically-acceptable acids should be employed in therapeutic applications. Particularly effective salts are those formed with pharmaceutically-acceptable acids having a pK value of 3 or lower. Such acids are well-known in the art, for example, hydrochloric, hydrobromic, sulfuric, nitric, phosphoric, benzenesulfonic, toluenesulfonic, methylsulfonic, ethylsulfonic acids and the like. These salts may be prepared by procedures commonly employed in the art, for example, reacting the compound with an equivalent of the selected acid in aqueous solution and concentration of the solution. Other known procedures may also be employed.

The following examples are given by way of illustration and are not to be construed as limitations of this invention many variations of which are possible within the scope and spirit thereof.

EXAMPLE I

*N-Benzyl-Beta(Isonicotinylhydrazino)Propionamide*

A slurry of 7.5 g. (0.034 mole) of 1-isonicotinyl-2-(carbomethoxyethyl)-hydrazine and 5 ml. of benzylamine is heated with stirring at 130° for three hours. The cooled mass is then recrystallized from ethyl acetate to yield white needles melting at 151.1°–152.1° C. Elemental analysis gives the following results:

Calcd. for $C_{16}H_{18}N_4O$: C, 64.43; H, 6.07; N, 18.77. Found: C, 64.43; H, 6.27; N, 19.17.

EXAMPLE II

*N-Benzyl-Beta-(Benzoylhydrazino)Propionamide*

This compound is prepared by the procedure of Example I employing 1-benzoyl-2-(carboethoxyethyl)hydrazine in place of the corresponding isonicotinyl compound. The product melts at 164°–165° C. Elemental analysis agrees with the calculated values.

EXAMPLE III

*N-(p.Chlorobenzyl)-(Beta-Isonicotinylhydrazino) Propionamide*

The procedure of Example I is repeated employing p.chlorobenzylamine in place of benzylamine. The product melts at 162°–163° C.

EXAMPLE IV

*N-(4-Picolyl)-Beta-(Benzoylhydrazino)Propionamide*

This compound is prepared by the procedure of Example I employing 4-picolylamine and 1-benzoyl-2-(carbomethoxyethyl)hydrazine. The product melts at 125°–127° C.

Additional N-substituted-beta-(acylhydrazino)propionamides prepared employing suitable 1-acyl-2-(carboalkoxyethyl)hydrazines and appropriate amines are:

N-benzyl-beta - (2 - furoylhydrazino)propionamide (M.P. 183–184° C.)
N-furfuryl - beta - (isonicotinylhydrazino)propionamide (M.P. 129–131° C.)
N-phenylethyl - beta - (isonicotinylhydrazino)propionamide (M.P. 145–147° C.)
N-(3,4-dimethoxyphenylethyl) - beta - (isonicotinylhydrazino)propionamide (M.P. 110–114° C.)
N-(3-methylbenzyl) - beta - (isonicotinylhydrazino)propionamide (M.P. 114–116° C.)
N-(4-methylbenzyl) - beta - (isonicotinylhydrazino)propionamide (M.P. 133–135° C.)
N-(2-chlorobenzyl) - beta - (isonicotinylhydrazino)propionamide (M.P. 148–149° C.)
N-(2-methylbenzyl) - beta - isonicotinylhydrazino)propionamide (M.P. 148–149° C.)
N-(3,4-dichlorobenzyl) - beta - (isonicotinylhydrazino)propionamide (M.P. 139–140° C.)
N-(2,4-dichlorobenzyl) - beta - (isonicotinylhydrazino)propionamide (M.P. 137–139° C.)
N-benzyl - beta-(nicotinylhydrazino)propionamide (M.P. 125–126° C.)
N-benzyl - beta-(cyclohexylcarbohydrazino)propionamide (M.P. 150–152° C.)
N - methyl - beta - (isonicotinylhydrazino)propionamide (M.P. 119° C.)
N-ethyl-beta-(isonicotinylhydrazino)propionamide (M.P. 131–132° C.)
N-n-propyl - beta - (isonicotinylhydrazino)propionamide (M.P. 118–120° C.)
N-i-propyl - beta - (isonicotinylhydrazino)propionamide (M.P. 163–165° C.)
N-n-butyl - beta - (isonicotinylhydrazino)propionamide (M.P. 120–122° C.)
N-i-butyl - beta - (isonicotinylhydrazino)propionamide (M.P. 146–147° C.)
N-cyclohexyl - beta-(isonicotinylhydrazino)propionamide (M.P. 166–167° C.)
N-allyl-beta-(isonicotinylhydrazino)propionamide (M.P. 117–119° C.)
N-phenethyl - beta - (isonicotinylhydrazino)propionamide (M.P. 145–147° C.)
N-benzyl-beta-(3 - chlorobenzoylhydrazino)propionamide (M.P. 151–153° C.)
N-benzyl-beta-(4 - fluorobenzoylhydrazino)propionamide (M.P. 214–216° C.)

EXAMPLE V

*N-Benzyl-α-Hydrazinoacetamide*

This compound is prepared by the procedure of Example I employing benzylamine and methyl α-hydrazinoacetate.

Similarly, additional N-substituted hydrazinoalkanoamides are prepared employing suitable amines:

N-methyl-N-benzyl-α-hydrazinoacetamide
N-pyridyl-α-hydrazinoacetamide
N-n-propyl-α-hydrazinoacetamide
N-(p-chlorobenzyl)-α-hydrazinoacetamide
N-(2-furfuryl)-α-hydrazinoacetamide
N-(allyl)-α-hydrazinoacetamide
N-benzyl-β-hydrazinopropionamide
N-allyl-β-hydrazinopropionamide
N-n-propyl-ε-hydrazinohexanoamide
N-cyclobutyl-α-hydrazinoacetamide
N-pentyl-α-hydrazinopropionamide
N-cyclohexyl-N-methyl-β-hydrazinobutyramide
N-phenethyl-α-hydrazinobutyramide
N-4-chlorobenzyl-β-hydrazinopropionamide
N-4-fluorobenzyl-α-hydrazinopropionamide
N-4-methylbenzyl-α-hydrazinopropionamide
N-3,4-dichlorobenzyl-α-hydrazinopropionamide
N-2,4-dibromobenzyl-α-hydrazinopropionamide
N-4-iodobenzyl-β-hydrazinoproprionamide
N-3-methylbenzyl-β-hydrazinopropionamide
N-4-propylphenyl-β-hydrazinopropionamide
N-phenyl-β-hydrazinopropionamide
N-furfuryl-β-hydrazinopropionamide
N-thienylmethyl-β-hydrazinopropionamide N-2-methylfurfuryl-β-hydrazinopropionamide
N-2-pyridyl-β-hydrazinopropionamide
N-3-pyridyl-β-hydrazinopropionamide
N-2-pyridylpropyl-β-hydrazinopropionamide
N-4-pyridyl-β-hydrazinopropionamide
N-2-furylpropyl-β-hydrazinopropionamide
N-(3,4-dimethoxybenzyl)-β-hydrazinopropionamide
N-(4-trifluoromethylbenzyl)-β-hydrazinopropionamide
N-(3-acetylphenyl)-β-hydrazinopropionamide
N-(4-butyrylphenylbutyl)-β-hydrazinopropionamide
N-(4-bromophenyl)-γ-hydrazinobutyramide
N-(3,4-dipropoxybenzyl)-β-hydrazinopropionamide N-(4-methoxyphenyl)-β-hydrazinopropionamide
N-(6-ethyl-2-pyridyl)-β-hydrazinopropionamide
N-(4-ethylbenzyl)-β-hydrazinopropionamide

EXAMPLE VI

A number of N-substituted-acylhydrazinoalkanoamides are prepared employing the procedure of Example I from suitable 1-acyl-2-(carboalkoxyalkyl)hydrazines and amines. In Table I are listed such compounds together with the corresponding substituted hydrazines from which they were prepared with $R_1R_2NH$.

Table I $$RCONHNHZCON\begin{matrix}R_1\\R_2\end{matrix} \qquad RCONHNHZCOOR_4$$

| R | $R_1$ | Z | $R_2$ | |
|---|---|---|---|---|
| $C_6H_5$ | H | $-(CH_2)_2-$ | $pBrC_6H_4CH_2$ | $C_6H_5CONHNHCH_2CH_2COOCH_3$ |
| 2-$(C_5H_4N)$ | $CH_3$ | $-CH(CH_3)CH_2-$ | $pIC_6H_4CH_2$ | 2-$(C_5H_4N)CONHNHCH(CH_3)CH_2COOCH_3$ |
| 3-$(C_5H_4N)$ | H | $-(CH_2)_3-$ | $pFC_6H_4CH_2$ | 3-$(C_5H_4N)CONHNH(CH_2)_3COOC_2H_5$ |
| $C_6H_5$ | $C_2H_5$ | $-CH(C_2H_5)CH_2-$ | 6-$CH_3(C_5H_3N)CH_2$ | $C_6H_5CONHNHCH(C_2H_5)CH_2COOC_2H_5$ |
| 4-$(C_5H_4N)$ | H | $(CH_2)_3$ | $pC_2H_5OC_6H_4CH_2$ | 4-$(C_5H_4N)CONHNH(CH_2)_3COOC_3H_7$ |
| $C_6H_5$ | $CH_3$ | $-CH(CH_3)CH(CH_3)-$ | $pCH_3OC_6H_4CH_2$ | $C_6H_5CONHNHCH(CH_3)CH(CH_3)COOCH_3$ |
| 4-$(C_5H_4N)$ | $CH_3$ | $-CH(CH_3)CH(C_2H_5)-$ | $pC_3H_7OC_6H_4CH_2$ | 4-$(C_5H_4N)CONHNHCH(CH_3)CH(C_2H_5)COOC_2H_5$ |
| $C_6H_5$ | $C_3H_7$ | $-CH(C_3H_7)CH_2-$ | $C_6H_5C_2H_4$ | $C_6H_5CONHNHCH(C_3H_7)CH_2COOC_2H_5$ |
| 4-$(C_5H_4N)$ | H | $-(CH_2)_2-$ | $C_6H_5C_3H_7$ | 4-$(C_5H_4N)CONHNH(CH_2)_2COOCH_3$ |
| 2-$(C_4H_3O)$ | H | $-(CH_2)_2-$ | 2-$(C_5H_4N)CH_2$ | 2-$(C_4H_3O)CONHNH(CH_2)_2COOCH_3$ |
| 4-$(C_5H_4N)$ | H | $-(CH_2)_2-$ | 2-$(C_5H_4N)C_2H_4$ | 4-$(C_5H_4N)CONHNH(CH_2)_2COOC_2H_5$ |
| 3-$(C_4H_3O)$ | $CH_3$ | $-CH_2CH(CH_3)-$ | $(C_4H_3O)CH_2$ | 3-$(C_4H_3O)CONHNHCH_2CH(CH_3)COOCH_3$ |
| $C_6H_5$ | H | $-CH_2CH(CH_3)-$ | $(C_4H_3O)C_2H_4$ | $C_6H_5CONHNHCH_2CH(CH_3)COOC_3H_7$ |
| 2-$(C_5H_4N)$ | H | $-CH_2CH(C_2H_5)-$ | 3,4-$Cl_2C_6H_4CH_2$ | 2-$(C_5H_4N)CONHNHCH_2CH(C_2H_5)COOCH_3$ |
| 2-$(C_4H_3S)$ | H | $-(CH_2)_2-$ | $C_6H_5CH_2$ | 2-$(C_4H_3S)CONHNHCH_2CH_2COOCH_3$ |
| 3-$(C_4H_3S)$ | H | $-(CH_2)_2-$ | $pClC_6H_4CH_2$ | 3-$(C_4H_3S)CONHNHCH_2CH_2COOCH_3$ |
| $C_6H_5$ | H | $-(CH_2)_2-$ | $pC_3H_7C_6H_4CH_2$ | $C_6H_5CONHNHCH_2CH_2COOCH_3$ |
| 4-$ClC_6H_4$ | H | $-(CH_2)_2-$ | $C_6H_5CH_2$ | 4-$ClC_6H_4CONHNH(CH_2)_2COOCH_3$ |
| 3,5-$Cl_2C_6H_3$ | H | $-(CH_2)_2-$ | $n$-$C_4H_9$ | 3,5-$Cl_2C_6H_3CONHNH(CH_2)_2COOCH_3$ |
| 4-$CH_3OC_6H_4$ | H | $-(CH_2)_2-$ | Allyl | 4-$CH_3OC_6H_4CONHNH(CH_2)_2COOCH_3$ |
| $C_6H_5CH_2$ | H | $-CH_2-$ | $C_6H_5CH_2$ | $C_6H_5CH_2CONHNHCH_2COOCH_3$ |
| $C_6H_5C_2H_4$ | H | $-CH_2-$ | $n$-$C_3H_7$ | $C_6H_5(CH)_2CONHNHCH_2COOC_2H_5$ |
| 4-$CH_3C_6H_4$ | H | $-(CH_2)_2-$ | $C_6H_5(CH_2)_3$ | 4-$CH_3C_6H_4CONHNH(CH_2)_2COOCH_3$ |
| 2-$OH_3C_6H_4$ | H | $CH_2$ | Cyclobutyl | 2-$CH_3C_6H_4CONHNHCH_2COOCH_3$ |
| 4-$C_3H_7C_6H_4$ | H | $-CH(CH_3)CH_2-$ | Cyclohexyl | 4-$C_3H_7C_6H_4CONHNHCH(CH_3)CH_2COOCH_3$ |
| 2,4-$(CH_3)_2C_6H_3$ | H | $-CH(CH_3)-$ | Pentenyl | 2,4-$(CH_3)_2C_6H_3CONHNHCH(CH_3)COOC_2H_5$ |
| 2-$CH_3$-5-$(C_4H_2O)$ | H | $-CH(C_2H_5)-$ | $C_7H_5(CH_2)_2$ | 2-$CH_3$-5-$(C_4H_2O)CONHNHCH(C_2H_5)COOC_2H_5$ |
| 2-$CH_3$-3-$(C_4H_2O)$ | H | $(CH_2)_2$ | 4-$ClC_6H_4CH_2$ | 2-$CH_3$-3-$(C_4H_2O)CONHNH(CH_2)_2COOC_2H_5$ |
| 2-$C_3H_7$-5-$(C_4H_2S)$ | H | $-CH(CH_3)-$ | 4-$FC_6H_4CH_2$ | 2-$C_3H_7$-(4-$C_4H_2S)CONHNHCH(CH_3)COOCH_3$ |
| 2-$(C_4H_3S)CH_2$ | H | $-CH(C_2H_5)-$ | 4-$CH_3C_6H_4CH_2$ | 2-$(C_4H_3S)CH_2CONHNHCH(CH_3)COOCH_3$ |
| 2-$CH_3$-5-$(C_4H_2O)CH_2$ | H | $-CH(CH_3)-$ | 3,4-$Cl_2C_6H_3CH_2$ | 2-$CH_3$-5-$(C_4H_2O)CH_2CONHNHCH(CH_3)COOCH_3$ |
| 2-$(C_4H_3S)(CH_2)_3$ | H | $-CH(CH_3)-$ | 2,4-$Br_2C_6H_3CH_2$ | 2-$(C_4H_3S)(CH_2)_3CONHNHCH(CH_3)COOCH_3$ |
| $(C_3H_2NS)$ | H | $(CH_2)_2$ | 4-$IC_6H_4CH_2$ | $(C_3H_2NS)CONHNH(CH_2)_2COOC_2H_5$ |
| $(C_2H_2OS)$ | H | $(CH_2)_3$ | 4-$C_3H_7C_6H_4CH_2$ | $(C_3H_2OS)CONHNH(CH_2)_2COOCH_3$ |
| (iso-$C_3H_2OS$) | H | $(CH_2)_2$ | $C_6H_5CH_2$ | (iso-$C_3H_2OS)CONHNH(CH_2)_2COOCH_3$ |
| (iso-$C_3H_2OS)CH_2$ | H | $(CH_2)_2$ | $C_6H_5CH_2$ | (iso-$C_3H_2OS)CH_2CONHNH(CH_2)_2COOCH_3$ |
| $CH_3$ | H | $(CH_2)_2$ | 2-$(C_4H_3S)CH_2$ | $CH_3CONHNH(CH_2)_2COOCH_3$ |
| $C_{17}H_{35}$ | $CH_3$ | $CH_2$ | 2-$(C_4H_3S)(CH_2)_3$ | $C_{17}H_{35}CONHNH(CH_2)_2COOCH_3$ |
| $C_{17}H_{33}$ | H | $(CH_2)_3$ | 4-$C_5H_4N$ | $C_{17}H_{33}CONHNH(CH_2)_2COOCH_3$ |
| $C_{20}H_{41}$ | H | $(CH_2)_3$ | 3-$C_5H_4N$ | $C_{20}H_4CONHNH(CH_2)_2COOCH_3$ |
| $C_2H_3$ | H | $(CH_2)_2$ | 6-$CH_3$-2-$C_5H_4N$ | $C_2H_3CONHNH(CH_2)_2COOCH_3$ |
| $C_3H_7$ | H | $(CH_2)_2$ | $(C_4H_3O)(CH_2)_3$ | $C_3H_7CONHNH(CH_2)_2COOCH_3$ |
| $C_{11}H_{23}$ | H | $(CH_2)_2$ | 3,4-$(CH_3O)_2C_6H_3CH_2$ | $C_{11}H_{23}CONHNH(CH_2)_2COOCH_3$ |
| $C_8H_{15}$ | H | $-(CH_2)_2-$ | 4-$C_3H_7OC_6H_4(CH_2)_4$ | $C_8H_{15}CONHNH(CH_2)_2COOCH_3$ |
| $C_{20}H_{39}$ | H | $-(CH_2)_3-$ | 4-$BrC_6H_4$ | $C_{20}H_{39}CONHNH(CH_2)_3COOCH_3$ |
| $C_{15}H_{31}$ | $CH_3$ | $-(CH_2)_2-$ | 3,4-$(C_3H_7O)_2C_6H_3CH_2$ | $C_{15}H_{31}CONHNH(CH_2)_2COOCH_3$ |
| $C_6H_{11}$ | $C_3H_7$ | $-(CH_2)_2-$ | 6-$C_2H_5$-2-$C_5H_3N$ | $C_6H_{11}CONHNH(CH_2)_2COOCH_3$ |
| $CH_3CH(Cl)$ | H | $-(CH_2)_2-$ | 4-$C_2H_5C_6H_4CH_2$ | $CH_3CH(Cl)CONHNH(CH_2)_2COOC_2H_5$ |
| $CH_2(NH_2)$ | H | $-(CH_2)_2-$ | $n$-$C_3H_7$ | $CH_2(NH_2)CONHNH(CH_2)_2COOCH_3$ |
| $CH_3CH(NH_2)$ | H | $-(CH_2)_2-$ | $C_6H_5CH_2$ | $CH_3CH(NH_2)CONHNH(CH_2)_2COOCH_3$ |
| $NH_2(CH_2)_3CH(NH_2)$ | H | $-(CH_2)_2-$ | $C_6H_5CH_2$ | $NH_2(CH_2)_4CH(NH_2)CONHNH(CH_2)_2COOCH_3$ |
| $HOCH_2CH(NH_2)$ | H | $-(CH_2)_2-$ | $n$-$C_3H_7$ | $HOCH_2CH(NH_2)CONHNH(CH_2)_2COOCH_3$ |
| $CH_3CH(OH)CH(NH_2)$ | H | $-(CH_2)_2-$ | $C_6H_5CH_2$ | $CH_3CH(OH)CH(NH_2)CONHNH(CH_2)_2COOCH_3$ |
| $(CH_3)_2CHCH(NH_2)$ | H | $-(CH_2)_2-$ | $C_6H_5(CH_2)_2$ | $(CH_3)_2CHCH(NH_2)CONHNH(CH_2)_2COOC_2H_5$ |
| $CH_3(CH_2)_3CH(NH_2)$ | H | $-(CH_2)_2-$ | $C_6H_5CH_2$ | $CH_3(CH_2)_3CH(NH_2)CONHNH(CH_2)_2COOCH_3$ |
| $C_6H_5CH_2CH(NH_2)$ | H | $-(CH_2)_2-$ | $n$-$C_3H_7$ | $C_6H_5CH_2CH(NH_2)CONHNH(CH_2)_2COOCH_3$ |
| 4-$OHC_6H_4CH_2CH(NH_2)$ | H | $-(CH_2)_2-$ | $C_7H_5CH_2$ | 4-$OHC_6H_4CH_2CH(NH_2)CONHNH(CH_2)_2COOCH$ |
| $HSCH_2CH(NH_2)$ | H | $-(CH_2)_2-$ | $n$-$C_3H_7$ | $HSCH_2CH(NH_2)CONHNH(CH_2)_2COOCH_3$ |
| $H_3CS(CH_2)_2CH(NH_2)$ | H | $-(CH_2)_2-$ | $C_6H_5CH_2$ | $H_3CS(CH_2)_2CH(NH_2)CONHNH(CH_2)_2COOCH_3$ |
| $C_3H_7S(CH_2)_2CH(NH_2)$ | H | $-(CH_2)_2-$ | $C_6H_5CH_2$ | $C_3H_7S(CH_2)_2CH(NH_2)CONHNH(CH_2)_2COOCH_3$ |
| $CH_3CH(OH)$ | H | $-(CH_2)_2-$ | 4-$ClC_6H_4CH_2$ | $CH_3CH(OH)CONHNH(CH_2)_2COOCH_3$ |
| $Cl(CH_2)_4$ | $CH_3$ | $-(CH_2)_2-$ | cyclopropyl | $Cl(CH_2)_4CONHNH(CH_2)_2COOCH_3$ |
| $CH_3(CH_2)_3CH(Br)$ | $C_2H_5$ | $-(CH_2)_2-$ | $C_6H_5(CH_2)_4$ | $CH_3(CH_2)_3CH(Br)CONHNH(CH_2)_2COOCH_3$ |
| $CH_3CH(F)$ | H | $-CH_2-$ | $C_6H_5CH_2$ | $CH_3CH(F)CONHNHCH_2COOC_2H_5$ |
| $CH_3CH_2CH(OCH_3)$ | H | $-CH_2-$ | $n$-$C_3H_7$ | $CH_3CH_2CH(OCH_3)CONHNHCH_2COOC_2H_5$ |
| $HO(CH_2)_4$ | H | $-CH(CH_3)-$ | $C_6H_5CH_2$ | $HO(CH_2)_4CONHNHCONHNHCH(CH_3)COOC_2H_5$ |
| $C_{10}H_{21}$ | H | $CH_2$ | cyclopropyl-$CH_2$ | $C_{10}H_{21}CONHNHCH_2COOCH_3$ |
| $C_{10}H_{19}$ | $CH_3$ | $(CH_2)_2$ | 2-$(C_4H_3O)(CH_2)_4-$ | $C_{10}H_{19}CONHNH(CH_2)_2COOCH_3$ |
| $CH_3CONHCH_2$ | H | $(CH_2)_4$ | 4-$CF_3C_6H_4-$ | $CH_3CONHCH_2CONHNH(CH_2)_4COOC_2H_5$ |
| $CH_3(C_3H_7CONH)CH-$ | H | $(CH_2)_4$ | 4-$CNC_6H_4-$ | $CH_3(CH_3CONH)CHCONHNH(CH_2)_2COOCH_3$ |
| $CH_3(CH_3COO)CH-$ | H | $(CH_2)_4$ | 4-$CF_3C_6H_4CH_2-$ | $CH_3(CH_3COO)CHCONHNH(CH_2)_4COOCH_3$ |
| $C_3H_7COO(CH_2)_4-$ | H | $(CH_2)_4$ | 2-$C_3H_7$-5-$(C_4H_2O)CH_2-$ | $C_3H_7COO(CH_2)_4CONHNH(CH_2)_2COOCH_3$ |
| $CH_3COSCH_2CH_2-$ | H | $(CH_2)_4$ | 2-$CH_3$-6-$(C_5H_3N)-$ | $CH_3COSCH_2CONHNH(CH_2)_4COOCH_3$ |
| $HSCH_2CH_2-$ | H | $(CH_2)_2$ | 2-$CH_3$-5-$(C_4H_2O)CH_2-$ | $HSCH_2CH_2CONHNH(CH_2)_2COOCH_3$ |
| $C_2H_5COS(CH_2)_3$ | H | $CH_2$ | 4-$CNC_6H_4CH_2-$ | $C_2H_5COS(CH_2)_3CONHNH(CH_2)_2COOC_2H_5$ |
| Cyclohexyl-$CH_2-$ | H | $(CH_2)_2$ | 4-$CH_3COC_6H_4-$ | cyclohexyl-$CH_2CONHNH(CH_2)_2COOCH_3$ |
| $C_6H_5(CH_2)_4-$ | H | $CH_2$ | 4-$CH_3COC_6H_4CH_2-$ | $C_6H_5(CH_2)_4CONHNHCH_2COOC_2H_5$ |
| 4-$CNC_6H_4-$ | H | $(CH_2)_2$ | 4-$C_2H_5COC_6H_4-$ | 4-$CNC_6H_4CONHNH(CH_2)_2COOC_3H_7$ |
| $CF_3C_6H_4-$ | H | $(CH_2)_2$ | 3,4-$Br_2C_6H_3-$ | 4-$CF_3C_6H_4CONHNH(CH_2)_2COOC_3H_7$ |

Table 1—Continued $$RCONHNHZCON\begin{matrix}R_1\\R_2\end{matrix} \qquad RCONHNHZCOOR_4$$

| R | R₁ | Z | R₂ | RCONHNHZCOOR₄ |
|---|---|---|---|---|
| CF₃C₆H₄(CH₂)₄— | C₂H₅ | CH₂ | C₆H₅ | CF₃C₆H₄(CH₂)₄CONHNHCH₂COOCH₃ |
| 3,5-Cl₂C₆H₃— | H | (CH₂)₂ | pyrryl | 3,5-Cl₂C₆H₃CONHNH(CH₂)₂COOCH₃ |
| 4-IC₆H₄— | H | (CH₂)₂ | pyrryl-CH₂— | 4-IC₆H₄CONHNH(CH₂)₂COOCH₃ |
| 4-CH₃COC₆H₄CH₂— | H | (CH₂)₂ | pyrazyl | 4-CH₃COC₆H₄CH₂CONHNH(CH₂)₂COOCH₃ |
| 4-C₃H₇COC₆H₄— | H | (CH₂)₂ | Pyrazyl- | 4-C₃H₇COC₆H₄CONHNH(CH₂)₂COOCH₃ |
| 3,5-(CH₃)₂C₆H₃— | H | (CH₂)₂ | 3,5-(CH₃)₂C₆H₃— | 3,5-(CH₃)₂C₆H₃CONHNH(CH₂)₂COOC₂H₅ |
| 3-Br-4-CH₃C₆H₃ | H | (CH₂)₂ | 4-C₂H₅C₆H₄— | 3-Br-4CH₃C₆H₃CONHNH(CH₂)₂COOCH₃ |
| 4-FC₆H₄(CH₂)₄— | H | (CH₂)₂ | CH₃— | 4-FC₆H₄(CH₂)₄CONHNH(CH₂)₂COOCH₃ |
| 4-C₃H₇C₆H₄— | H | (CH₂)₂ | C₅H₁₃— | 4-C₃H₇C₆H₄CONHNH(CH₂)₂COOC₃H₇ |
| Cyclopropyl | H | (CH₂)₂ | 4-FC₆H₄CH₂— | Cyclopropyl-CONHNH(CH₂)₂COOC₃H₇ |
| Cyclobutyl-(CH₂)₂ | H | (CH₂)₂ | CH₃ | Cyclobutyl-CH₂CONHNH(CH₂)₂COOCH₃ |
| Cyclohexyl | H | (CH₂)₂ | C₆H₅CH₂ | Cyclohexyl-CH₂CONHNH(CH₂)₂COOCH₃ |
| Cyclopropyl-(CH₂)₂ | H | (CH₂)₂ | C₆H₅CH₂ | Cyclopropyl-(CH₂)₂CONHNH(CH₂)₂COOCH₃ |
| 2-(C₄H₂S)(CH₂)₂— | H | (CH₂)₂ | C₆H₅CH₂ | 2-(C₄H₂S)(CH₂)₄CONHNH(CH₂)₂COOCH₃ |
| 2-C₃H₇-(C₄H₂O)— | H | (CH₂)₂ | 4-CH₃C₆H₄— | 2-C₃H₇-5-(C₄H₂O)CONHNH(CH₂)₂COOCH₃ |
| 2-(C₄H₂O)-(CH₂)₄ | H | (CH₂)₂ | 3-CH₃C₆H₄ | 2-(C₄H₂O)(CH₂)₄CONHNH(CH₂)₂COOCH₃ |
| 2-CH₃(C₄H₂S)CH₂— | H | (CH₂)₂ | 2-CH₃C₆H₄— | 2-CH₃-5-(C₄H₂S)CH₂CONHNH(CH₂)₂COOCH₃ |
| CH₃NHCH₂— | H | (CH₂)₂ | C₆H₄CH₂— | CH₃NHCH₂CONHNH(CH₂)₂COOCH₃ |
| CH₃(CH₃NH)CH— | H | (CH₂)₂ | CH₃— | CH₃(CH₃NH)CHCONHNH(CH₂)₂COOCH₃ |
| CH₃CH₂(C₃H₇NH)CH— | H | (CH₂)₂ | 2-(C₅H₄N) | CH₃CH₂(C₃H₇NH)CHCONHNH(CH₂)₂COOCH₃ |
| (CH₃)₂NCH₂— | H | (CH₂)₂ | 3-(C₅H₄N)— | (CH₃)₂NCH₂CONHNH(CH₂)₂COOCH₃ |
| 4-(C₅H₄N) | H | (CH₂)₂ | H | 4-(C₅H₄N)CONHNH(CH₂)₂COOCH₃ |
| 4-(C₅H₄N) | C₆H₅CH₂— | (CH₂)₂ | C₆H₅CH₂— | 4-(C₅H₄N)CONHNH(CH₂)₂COOCH₃ |
| (CH₃CO)(CH₃)NCH₂— | H | (CH₂)₂ | C₆H₅CH₂ | (CH₃CO)(CH₃)NCH₂COHNH(CH₂)₂COOCH₃ |
| 4-(C₅H₄N) | H | (CH₂)₂ | pyrazolyl-CH₂ | 4-(C₅H₄N)CONHNH(CH₂)₂COOCH₃ |
| 3-(C₅H₄N) | H | (CH₂)₂ | HOCH₂CH₂— | 3-(C₅H₄N)CONHNH(CH₂)₂COOCH₃ |
| C₆H₅ | H | (CH₂)₃ | CH₃OCH₂CH₂— | C₆H₅CONHNH(CH₂)₂COOCH₃ |
| 3-(C₅H₄N) | H | (CH₂)₂ | H | 3-(C₅H₄N)CONHNH(CH₂)₂COOC₂H₅ |

Similarly, β-(isonicotinylhydrazino)propionyl piperidine is prepared

| R | R₁ | Z | R₂ | RCONHNHZCOOR₄ |
|---|---|---|---|---|
| Br(CH₂)₃— | H | —CH(CH₃)— | C₅H₄N | Br(CH₂)₃CONHNHCONHNHCH(CH₃)COOCH₃ |
| CH₃CHBrCHBr— | H | —CH₂— | (C₄H₃O)CH₂ | CH₃CH(Br)CH(Br)CONHNHCH₂COOC₂H₅ |
| ICH₂CH₂— | H | —(CH₂)₂— | C₄H₉ | ICH₂CH₂CONHNHCH₂COOC₂H₅ |
| CH₃(CH₂)₁₂CH(I) | H | —(CH₂)₂— | C₆H₅CH₂ | CH₃(CH₂)₁₂CH(I)CONHNH(CH₂)₂COOCH₃ |
| C₃H₇O(CH₂)₄ | H | —(CH₂)₂— | 4-CH₃COC₆H₄CH₂ | C₃H₇O(CH₂)₄CONHNH(CH₂)₂COOCH₃ |
| HS(CH₂)₄— | H | —CH₂— | allyl | HS(CH₂)₄CONHNHCH₂COOC₂H₅ |
| CH₃S(CH₂)₄— | H | —CH₂— | n-C₃H₇ | CH₃S(CH₂)₄CONHNHCH₂COOC₂H₅ |

In the above table $C_5H_4N$ stands for pyridyl; $C_4H_3O$, $C_4H_3S$, $C_3H_2NS$, $C_3H_2NO$, and isoC₃H₂NO stand for furyl, thienyl, thiazolyl, oxazolyl and isoxazolyl respectively.

EXAMPLE VII

*Preparation of 1-Acyl-2-(Carboalkoxyalkyl)hydrazines (Method 1)*

(a) PREPARATION OF HYDRAZONES

Equimolar proportions of the acylhydrazine and the carbonyl compound are refluxed in ethanol for from 1–4 hours. In some cases, the crude product crystallizes out of this solution, while in others, concentration of the solution is necessary. The recovered hydrazone is then purified by recrystallization from solvent such as methanol, ethanol, ethyl acetate, isopropanol, hexane-ethyl acetate, pentane-methanol and the like. A number of acylhydrazones are prepared employing this procedure and are listed in Table II together with the carbonyl compounds reacted with $RCONHNH_2$.

Table II

| Acylhydrazone | | | | Carbonyl compound |
|---|---|---|---|---|
| R | R₁ | Z | R₂ | |
| C₆H₅ | H | CH₂ | CH₃ | O=CH—CH₂COOCH₃ |
| 2-(C₅H₄N) | CH₃ | CH₂ | CH₃ | CH₃COCH₂COOCH₃ |
| 3-(C₅H₄N) | H | (CH₂)₄ | C₂H₅ | O=CH(CH₂)₄COOC₂H₅ |
| C₆H₅ | C₂H₅ | CH₂ | C₂H₅ | C₂H₅COCH₂COOC₂H₅ |
| 4-(C₅H₄N) | H | (CH₂)₂ | C₃H₇ | O=CH(CH₂)₂COOC₃H₇ |
| C₆H₅ | CH₃ | CH(CH₃) | CH₃ | CH₃COCH(CH₃)COOCH₃ |
| 4-(C₅H₄N) | CH₃ | CH(C₂H₅) | C₂H₅ | CH₃COCH(C₂H₅)COOC₂H₅ |
| C₆H₅ | C₃H₇ | CH₂ | C₂H₅ | C₃H₇COCH₂COOC₂H₅ |
| 4-(C₅H₄N) | H | CH₂ | CH₃ | O=CHCH₂COOCH₃ |
| 2-(C₄H₃O) | H | CH₂ | C₂H₅ | O=CHCH₂COOC₂H₅ |
| 4-(C₅H₄N) | H | CH₂ | C₂H₅ | O=CHCH₂COOC₂H₅ |
| 3-(C₄H₃O) | CH₃ | CH(CH₃) | CH₃ | CH₃COCH(CH₃)COOCH₃ |
| C₆H₅ | H | CH(CH₃) | C₃H₇ | O=CHCH(CH₃)COOC₃H₇ |
| 2-(C₅H₄N) | H | CH(C₂H₅) | CH₃ | O=CHCH(C₂H₅)COOCH₃ |
| 2-(C₄H₃S) | H | CH₂ | CH₃ | O=CH—CH₂COOCH₃ |
| 2-(C₄H₃S) | H | CH₂ | CH₃ | O=CH—CH₂COOCH₃ |

(b) REDUCTION OF HYDRAZONES

Hydrogenation is conducted in a Parr apparatus at three atmospheres. The method consists in shaking 10 g. of the acylhydrazone with 0.5 g. of platinum oxide in 150 ml. of ethanol. Hydrogen absorption generally stops when one equivalent of hydrogen is absorbed. The reduced product is isolated by filtering off catalyst, concentrating the solution at reduced pressure and recrystallizing the product from acetone, ethylacetate, pentane-acetone, pentane-ethyl acetate and the like.

The above described hydrazones are respectively hydrogenated to the following 1-acyl-2-(carboalkoxyalkyl)hydrazine.

1-benzoyl-2-(β-carbomethoxyethyl)hydrazine
1-picolinoyl-2-(β-carbomethoxypropyl)hydradine
1-nicotinyl-2-(ε-carboethoxypentyl)hydrazine
1-benzoyl-2-(β-carboethoxybutyl)hydrazine
1-isonicotinyl-2-(γ-carbopropoxypropyl)hydrazine
1-benzoyl-2-(α-methyl, β-carbomethoxypropyl)hydrazine
1-isonicotinyl-2-(α-methyl, β-carboethoxybutyl)hydrazine
1-benzoyl-2-(α-propyl, β-carboethoxyethyl)hydrazine
1-isonicotinyl-2-(β-carbomethoxyethyl)hydrazine
1-(2-furoyl)2-(β-carbomethoxyethyl)hydrazine
1-isonicotinyl-2-(β-carboethoxyethyl)hydrazine
1-(3-furoyl)2-(α-methyl, β-carboethoxypropyl)hydrazine
1-benzoyl-2-(β-carbopropoxypropyl)hydrazine
1-picolinoyl-2-(β-carbomethoxybutyl)hydrazine
1-(2-thenoyl)-2-(β-carbomethoxyethyl)hydrazine
1-(3-thenoyl)-2-(β-carbomethoxyethyl)hydrazine Other 1-acyl-2-(carbalkoxyalkyl)hydrazines employed in the previous examples are prepared employing this procedure.

EXAMPLE VIII

Preparation of compounds of the formula $RCONHNHCHCH_3COG$ with R₃ substituent

These compounds are prepared by heating a selected acylhydrazine with an α,β-unsaturated acid ester or amide with glacial acetic acid in an alkanol solvent.

For example, methyl acrylate, 28.0 g. (0.4 mole) was added dropwise during one hour to a solution containing 54.8 g. (0.4 mole) of isonicotinic acid hydrazide and 10 ml. of glacial acetic acid in 400 ml. of tertiary butyl alcohol. The resulting solution then was heated for 18 hours on a steam bath. Concentration of the reaction mixture to 100 ml. yielded 13.0 g. of unreacted isonicotinic acid hydrazide. The filtrate was concentrated to a thick syrup which was triturated with anhydrous ether and recrystallized from isopropyl alcohol; M.P. 87°–88.5° C. Elemental analysis of the product, 1-isonicotinyl-2-(β-carbomethoxymethyl)hydrazine, gave the following results:

Calcd. for $C_{10}H_{13}H_3O_3$: C, 53.81; N, 5.87. Found: C, 54.08; N, 5.65.

Employing this procedure, the following hydrazines are prepared from suitable α,β-unsaturated acid derivatives as listed in Table III and corresponding acylhydrazines, in 10–20% yields.

Table III

| Hydrazine product RCONHNHĊHCH$_2$COOR$_4$ (R$_3$) | α,β-unsaturated ester |
|---|---|
| 1-benzoyl-2-(β-carbomethoxyethyl)hydrazine | Methylacrylate. |
| 1-picolinoyl-2-(β-carbomethoxypropyl)hydrazine | Methyl butenoate. |
| 1-benzoyl-2-(β-carboethoxybutyl)hydrazine | Ethyl pentenoate. |
| 1-benzoyl-2-(β-carboethoxypentyl)hydrazine | Ethyl hexenoate. |
| 1-isonicotinyl-2-(β-carboethoxyethyl)hydrazine | Ethyl acrylate. |
| 1-isonicotinyl-2-(β-methyl, β-carbopropoxyethyl)hydrazine | Propyl butenoate. |
| 1-(3-furoyl)-2-(β-carbomethoxybutyl)hydrazine | Methyl acrylate. |
| 1-(2-thenoyl)-2-(β-carbomethoxyethyl)hydrazine | Do. |
| 1-(3-thenoyl)-2-(β-carbomethoxyethyl)hydrazine | Do. |

| Hydrazine product (RCONHNHĊHCH$_2$CON⟨R$_1$/R$_2$⟩) | α,β-unsaturated ester |
|---|---|
| N-benzyl-β-(benzoylhydrazino)propionamide | N-benzylacrylamide. |
| N-phenethyl-β-(picolinylhydrazino)butyramide | N-(phenethyl)acrylamide. |
| N-cyclohexyl-β-(benzoylhydrazino)pentanoamide | N-cyclohexylpentenoamide. |
| N-methyl-N-benzyl-β-(benzoylhydrazino)propionamide | N-methyl-N-benzylacrylamide. |
| N-allyl-β-(isonicotinylhydrazino)hexanoamide | N-allylhexenoamide. |
| N-n-propyl-β-(2-furoylhydrazino)propionamide | N-n-propylacylamide. |
| N-benzyl-β-(isoxazolylcarbohydrazino)propionamide | N-benzylacrylamide. |

The hydrazines of the same general formulae mentioned in the previous examples are prepared in the same manner from corresponding α,β-unsaturated acid derivatives and acylhydrazines.

The reactions are carried out using as solvents tertiary alcohols such as tertiary butanol, 1,1-dimethylpropanol, 1,1-dimethylbutanol and 1-methyl-1-ethylbutanol.

The starting materials for the above described reactions, viz. the carbonyl compounds and the α,β-unsaturated esters, are readily available in most cases or easily preparable by conventional procedures well known in the art. The acid hydrazides employed are well-known compounds which are readily available or preparable by standard procedures from acids such as benzoic acid, 2-furoic acid, 3-furoic acid, 2-thenoic acid, pyridine-2-pyridine-3- and pyridine-4-carboxylic acids.

EXAMPLE IX

The procedure of Example VIII is repeated employing a 40% molar excess of methyl acrylate. The yield of product is 40%.

EXAMPLE X

The hydrochloride salt of N-benzyl-beta-isonicotinylhydrazino propionamide is prepared by dissolving the compound in an aqueous solution containing an equivalent amount of hydrochloric acid and evaporating the resultant solution.

Other acid addition salts of the new pyridine compounds of the present invention described in the above examples are prepared by this same procedure employing sulfuric acid, phosphoric acid, hydrobromic acid, nitric acid, benzenesulfonic acid and toluenesulfonic acid.

EXAMPLE XI

A tablet base was prepared by blending the following ingredients in the proportion by weight indicated.

Sucrose U.S.P. ............................................. 80.3
Tapioca starch .......................................... 13.2
Magnesium stearate ................................. 6.5

Into this base there was blended sufficient N-benzyl-beta-isonicotinylhydrazinopropionamide to provide tablets each containing 10, 25, 50 and 100 mg. of active ingredient.

Other therapeutic agents as exemplified in the above examples were similarly blended into this tablet base.

EXAMPLE XII

Aqueous suspensions were prepared each containing 25 mg. per teaspoonful (5 ml.) of each of the above described therapeutic agents in a vehicle composed of U.S.P. simple syrup containing the following materials per 100 ml. of vehicle.

F.D. & C. Yellow No. 5 ........................... 5 mg.
Carboxymethylcellulose low-viscositiy type ... 1 mg.
Synthetic lemon flavor (Freitsche) ........... 0.5 ml.

These suspensions are partly cloudy but well adapted for oral administration of the active agent.

In addition to their use in the treatment of mental disease, the compounds of the present invention are effective monamine oxidase inhibitors especially in the central nervous system and are also useful for the relief of anginal pain. Many of these compounds possess anticonvulsant properties. These compounds are additionally useful for the amelioration of mood in rheumatoid arthritis, etc.

This application is a continuation of application Serial No. 808,921, filed April 27, 1959, now abandoned, which in turn is a division of application Serial No. 784,083, filed December 31, 1958 and now U.S. Letters Patent No. 2,894,972 of July 14, 1959, which in turn is a continuation-in-part of application Serial No. 749,061, filed July 17, 1958, and now abandoned.

What is claimed is:

1. A compound selected from the group consisting of compounds represented by the formula:

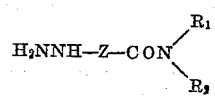

wherein
Z is alkylene containing 1 to 5 carbon atoms;
$R_1$ is selected from the group consisting of hydrogen and lower alkyl; and
$R_2$ is selected from the group consisting of alkyl and alkenyl each containing up to 5 carbon atoms; cycloalkyl containing 3 to 6 carbon atoms, pyridyl, pyridylalkyl, furylalkyl and thienylalkyl in which the alkyl group is lower alkyl, and ring-substituted derivatives thereof in which each ring-substituent is lower alkyl; aryl and aralkyl each represented by the formula:

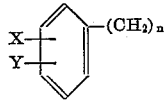

wherein X is selected from the group consisting of hydrogen, lower alkyl and halogen, Y is selected from the group consisting of hydrogen, lower alkyl, lower alkoxy, halogen, trifluoromethyl, cyano and alkanoyl containing 2 to 4 carbon atoms, and $n$ is an integer from 0 to 4; and the acid addition salts thereof.

2. The compound of the formula:

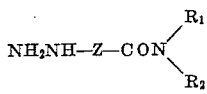

wherein Z is alkylene containing two carbon atoms in the principal chain and a total of up to 5 carbon atoms, $R_1$ is hydrogen and $R_2$ is alkyl containing up to 5 carbon atoms.

3. The compound of the formula:

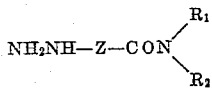

wherein Z is alkylene containing two carbon atoms in the principal chain and a total of up to 5 carbon atoms, $R_1$ is hydrogen and $R_2$ is halophenylalkyl containing up to two halo substituents on the phenyl moiety and up to four carbon atoms in the alkyl moiety.

4. The compound of the formula:

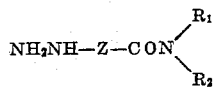

wherein Z is alkylene containing two carbon atoms in the principal chain and a total of up to 5 carbon atoms, $R_1$ is hydrogen and $R_2$ is phenylalkyl containing up to 4 carbon atoms in the alkyl moiety.

5. The compound of the formula:

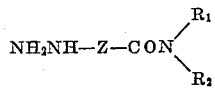

wherein Z is alkylene containing two carbon atoms in the principal chain and a total of up to 5 carbon atoms, $R_1$ is hydrogen and $R_2$ is furfuryl.

6. The compound of the formula:

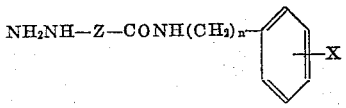

wherein Z is alkylene containing two carbon atoms in the principal chain and a total of up to 5 carbon atoms, $n$ is an interger from 0 to 4 and X is lower alkyl.

7. The compound of the formula:

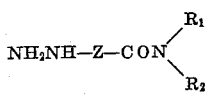

wherein Z is alkylene containing two carbon atoms in the principal chain and a total of up to 5 carbon atoms, $R_1$ is hydrogen and $R_2$ is alkenyl containing up to 5 carbon atoms.

8. N-benzyl-α-hydrazionacetamide.

No references cited.